(12) United States Patent
Alts et al.

(10) Patent No.: US 6,713,150 B2
(45) Date of Patent: Mar. 30, 2004

(54) ACOUSTICALLY EFFECTIVE REAR PARCEL SHELF

(75) Inventors: Thorsten Alts, Gross-Bieberau (DE); Jean Casulli, Mantes la Ville (FR); Claude Buisson, Conflans Sainte Honorine (FR)

(73) Assignee: Rieter Automotive (International) AG, Zollikon (CH)

( * ) Notice: Subject to any disclaimer, the term of this patent is extended or adjusted under 35 U.S.C. 154(b) by 0 days.

(21) Appl. No.: 10/169,394

(22) PCT Filed: Jan. 18, 2001

(86) PCT No.: PCT/CH01/00039

§ 371 (c)(1),
(2), (4) Date: Jul. 2, 2002

(87) PCT Pub. No.: WO01/58722

PCT Pub. Date: Aug. 16, 2001

(65) Prior Publication Data

US 2003/0003267 A1 Jan. 2, 2003

(30) Foreign Application Priority Data

Feb. 10, 2000 (CH) .................................... 270/00

(51) Int. Cl.⁷ ................................................ B32B 3/12
(52) U.S. Cl. ................. 428/73; 428/116; 428/188; 428/219; 428/304.4; 428/161; 428/166; 428/292.1; 428/340; 181/285; 181/286; 181/288; 181/290; 181/291; 181/292; 264/257; 264/258; 264/259; 264/271.1; 264/279.1
(58) Field of Search .................. 428/116, 117, 428/118, 174, 73, 178, 188, 219, 304.4, 156, 161, 166, 292.1, 340; 181/284, 285, 286, 288, 290, 291, 292; 264/239, 241, 257, 258, 259, 271.1, 279.1; 296/76

(56) References Cited

U.S. PATENT DOCUMENTS 4,479,992 A   10/1984  Häeseker

FOREIGN PATENT DOCUMENTS

| EP | 0649736 | * | 4/1995 |
| EP | 0 658 644 | | 6/1995 |
| EP | 0 787 578 | | 8/1997 |
| WO | WO 98/18656 | | 5/1998 |
| WO | WO 98/18657 | | 5/1998 |
| WO | WO 99/35007 | | 7/1999 |
| WO | WO 99/44817 | | 9/1999 |

* cited by examiner

Primary Examiner—Deborah Jones
Assistant Examiner—Wendy Boss
(74) Attorney, Agent, or Firm—Nath & Associates PLLC; Marvin C. Berkowitz

(57) ABSTRACT

The invention relates to a component part, especially a rear parcel shelf, and to a method for the production thereof, whereby the component part is provided with a honeycomb-like core layer (2) which is provided with a reinforcing layer (3, 4) on each side. This layer comprises a nonwoven that contains thermoplastic fibers. The core layer (2) is made of thermoplastic material and is connected to the thermoplastic fibers of the reinforcing layer (3, 4) b material fit. The reinforcing layer (3, 4) is precompressed and air permeable and has an air flow resistance ranging from 500 $Nsm^{-3} < R < 3500$ $Nsm^{-3}$.

13 Claims, 1 Drawing Sheet

ACOUSTICALLY EFFECTIVE REAR PARCEL SHELF

FIELD OF THE INVENTION

The present invention concerns a component part, and in particular to an acoustically effective rear shelf, or a cover for wheel guards, for storage compartments or luggage compartments in vehicles, as well as to a method for producing the same.

BACKGROUND OF THE INVENTION

Rear shelves are important components in the interior design of motor vehicles. They serve not only as a place to deposit articles, but they also separate the luggage compartment from the passenger compartment. It is therefore necessary that they are aesthetically pleasing, that they are sufficiently rigid to support weights of up to 30 kg, and, in particular, that they are acoustically effective in order to dampen the sound field transmitted from the luggage compartment to the passenger compartment, for example by the wheel guards. Furthermore these rear shelves must be light weight, economical to manufacture and must be able to meet the customer-specific requirements for vehicle interior linings.

SUMMARY OF THE INVENTION

A number of different interior linings are known which comprise a stiffening, honeycomb-like support member having reinforcing fiber layers on both sides and having at least one decor layer. Such a component is known, for example, from EP 0 787 578. This publication describes a multilayered component, whose support member has a honeycomb structure and whose cover layers are connected at the front edges of the individual honeycomb cells by frictional or form contact. These cover layers are made of a thermoplastic synthetic material and are not permeable to air. This component has a sound damping effect and is not suitable for use as an acoustically effective rear shelf in vehicles.

It is the aim of the present invention to provide a rear shelf having a high sound absorption, which is light weight, sufficiently rigid and is simple to manufacture. It is a further aim of the present invention to provide a component having distinct damping characteristics in order to controllably dampen the resonance emitted from luggage compartments, spare wheel guards and other storage spaces.

The publication WO 99135007 describes an ultralight, sound and shock absorbing assembly. This assembly comprises an intermediate layer 3 formed of a plurality of hollow or tube-like elements 2. These tube-like elements 2 fulfil two functions, namely they determine the shock absorbing capacity of the whole assembly on the one hand, and they serve the acoustic absorbing capacity on the other hand. However, this is only possible because a covering layer 6 functions as a sound permeable covering layer and thereby allows the field of sound which is to be absorbed to interact with the labyrinth of hollow spaces formed by the tube-like elements. This sound and shock absorbing assembly is therefore not suitable for use as a rear parcel shelf because of the loosely positioned layers.

In EP 0 658 644 a lightweight component part is described which is made of textiles having a large elasticity module. This lightweight component part is especially suitable for the production of overhead baggage compartments, as they are used by the airplane industry. These component parts do not have a particular acoustical absorption capacity and are therefore not suitable for use as acoustically effective rear parcel shelves in motor vehicles.

These aims are achieved by a component having honeycomb-like core layer, which is provided on both sides with a reinforcing layer. These reinforcing layers consist of an air permeable and thermoplastic fibrous material which comprises, for example, at least 50% polypropylene fibers. In this context, polypropylene fibers are intended to mean fibers made entirely of polypropylene or which are co-extruded, having a coating of polypropylene and a core of, for example, polyester which melts at higher temperatures. In a preferred embodiment of the inventive rear shelf the polypropylene fibers are materially bonded to or fused with the core layer. The air-permeability of the reinforcing layers is essential for the acoustic performance of the inventive rear shelf, whereby the air flow resistance of these reinforcing layers can be adjusted for a desired range. The choice and composition of the fibers/bonding agents used lies within the expertise of the specialist. It is therefore clear that these reinforcing layers can be manufactured using additives made of powdered bonding agents and/or semi-thermoplastic lacquer powder. In a preferred embodiment the proportion of reinforcing fibers contained in the reinforcing layers is around 30%. Mineral fibers, preferably glass fibers, synthetic fibers, preferably PES- or PA-fibers, polyacrylic, aramide and other fibers known to the specialist can be used as reinforcing fibers. The reinforcing layer on the passenger compartment side comprises between 50% to 80%, and preferably about 70% polypropylene fibers and between 20% to 50%, and preferably about 30% glass fibers or polyester fibers or aramide fibers. These reinforcing layers preferably have an area weight of between 300 to 1000 $g/m^2$ and are particularly suitable for the inventive rear shelf. In a further embodiment, the reinforcing layer comprises a first fibrous nonwoven layer having a polypropylene fiber content of approx. 20% and a second connecting layer with a light area weight of around 20–50 $g/m^2$ and composed of SMMS-fibers (Spun-bond, Melt-blown, Melt-blown, Spun-bond polypropylene fibers). It is to be understood that the thickness of the core layer can be varied according to the requirements. The honeycomb like core layer has a thickness of 10 mm to 30 mm and an area weight in the range of 800 $g/m^2$ to 1600 $g/m^2$, that means has a density of 25 $kg/M^3$ to 160 $kg/M^3$.

This aim is further achieved by a method whereby a stack having at least one honeycomb-like core layer with precompressed reinforcing layers arranged on both sides thereof is arranged between two heatable plates. With the aid of these plates the stack is heated such that the thermoplastic bonding fibers of the reinforcing layers and the bonding region of the core layer are softened and begin to melt, i.e. the core layer retains its shape and the reinforcing layers retain their air-permeability. After this heating phase the stack is transferred into a cold (moulding) tool, where the individual layers are bonded and are brought into their final form.

BRIEF DESCRIPTION OF THE DRAWINGS

In the following, the invention is explained in more detail with the help of a preferred embodiment and the drawings, in which.

Figure 1:
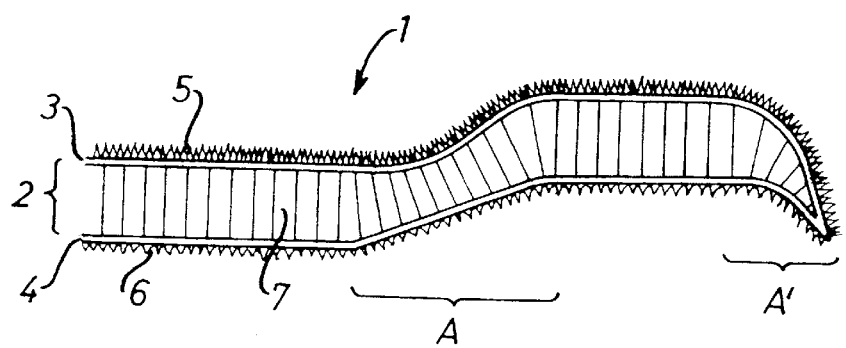
FIG. 1 shows a schematic section through a rear shelf according to the invention.

The assembly of the inventive rear shelf shown in FIG. 1 comprises a core layer 2 having a honeycomb-like structure.

The individual cells can have a polygonal or cylindrical form and any size cross-section. In a preferred embodiment, they are between 5–30 mm high, have a cross-section of around 10 mm and a wall thickness of between 50 to 500 µm. In a preferred embodiment this core layer 2 is made of polypropylene. This core layer 2 is connected on both its sides to a precompressed fiber or reinforcing layer 3, 4. This reinforcing layer essentially comprises more than 50% propylene fibers, preferably 70%, and reinforcing fibers, preferably glass fibers, polyester fibers or aramide fibers or suitable mixtures thereof. By means of the polypropylene fibers it is easily possible to achieve a connection or bonding with the core layer made of polypropylene. It is the purpose of these reinforcing layers 3 and 4 to provide the finished rear shelf with the required bending stiffness. This bending stiffness or tensile stiffness can reach values of between 10,000 and 1,000,000 Nm, if the reinforcing layer has been precompressed prior to its connection with the core layer 2. By using precompressed reinforcing layers it is avoided that these can bulge into the individual cells of the core layer in a cushion-like manner during the manufacturing process of the rear shelf. In accordance with the invention, care is taken that the reinforcing fibers in the reinforcing layer lie on one plane as far as possible, in order to thereby achieve a higher modulus of elasticity or to avoid that bulging reinforcing layers are formed which would have an undesirably low modulus of elasticity. In a preferred embodiment, reinforcing layers having an area weight of around 300 to 1000 g/m² are used on both the passenger compartment side as well as the trunk (or boot) side. The inventive rear shelf also permits the inclusion of additional layers, for example for improving the bonding connection between the core layer and the reinforcement layer. So called polypropylene SMMS-materials can be used for such additional layers. In a preferred embodiment this additional layer has an area weight of between 20 to 50 g/m².

DETAILED DESCRIPTION

In order to achieve the best possible acoustic effectiveness, these reinforcement layers 3, 4 are air-permeable and have an air flow resistance of between 500 to 3500 Nsm$^{-3}$, and preferably of between 1500 to 3000 Nsm$^{-3}$. This permits the sound field to penetrate into the individual cells 7 of the core layer 2 and to be absorbed, or to only partially penetrate and thereby to provide an acoustic connection with the space behind the core layer. It is to be understood that the reinforcing layers used can be precompressed, depending upon the mechanical and acoustical properties desired. This rear shelf can be provided with additional decor layers which can also be air permeable and can be made of nonwovens, felt, woven, knitted or other textile-like materials. A rear shelf constructed in this manner has, for example, an area weight of 2700 g/m², fulfils the conditions for the automobile industry with regard to stiffness and form stability, is not sensitive to air humidity, is olfactorily neutral and resistant to fungicidal growth. By means of a controlled use of reinforcing layers with a predeterminable air flow resistance and tensile stiffness it is possible to improve and to optimize the acoustic insulation capacity and in particular the sound absorption characteristics in a simple manner.

In a further development of the rear shelf according to the invention, the one or the other reinforcing layer 3, 4 is provided with an air-impermeable foil in order to thereby limit the sound absorption capacity on the one or the other side of the rear shelf. It is to be understood that the component part according to the invention can also be used as a cover for the spare wheel cavity or is particularly suitable for use as a wheel guard cover or side panel, for example in station wagons, With the present component part it is possible to affix attachment means, for example hinges, eyelets or similar by simple friction welding or gluing.

Figure 2:
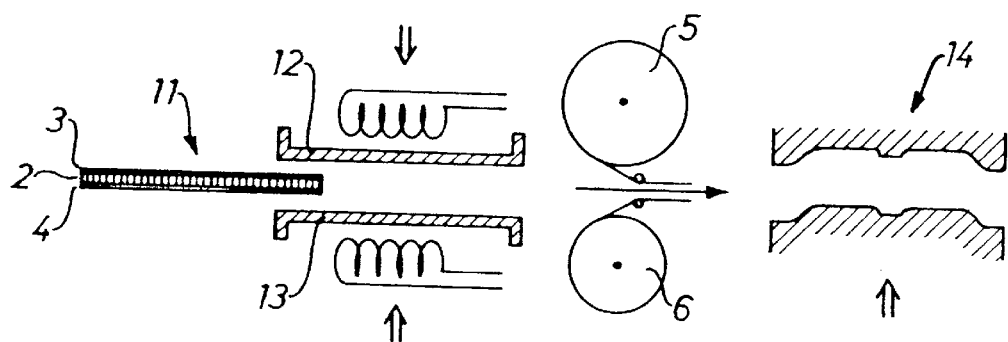
FIG. 2 shows a schematic view of a process for manufacturing the inventive rear shelf.

FIG. 2 shows a suitable method for manufacturing the component part according to the invention, With this method, a stack 11 is provided, which stack has a first precompressed and air permeable reinforcing layer 4, a honeycomb-like core layer 2 and a second precompressed and air-permeable reinforcing layer 3. In a next method step this stack 11 is heated between heatable plates 12, 13 in order to materially bond the reinforcing layers 3, 4 with the honeycomb-like core layer 2, i.e. to fuse these in the bonding region. In particular this is achieved in that the core layer 2 and the reinforcing layers 3, 4 to be bonded thereto comprise a thermoplastic material which bonds in its molten state and which solidifies upon cooling. In a preferred embodiment, the honeycomb-like core layer 2 is made of polypropylene and the reinforcing layers 3, 4 are made of a fibrous nonwoven containing at least 50% melting or bonding fibers, preferably polypropylene fibers. It is to be understood that the reinforcing layers 3, 4 can be multilayered and in particular can comprise a first layer of SMMS-material (Spun-bond, Melt-blown, Melt-blown, Spun-bond polypropylene fibers) and a second layer of a fibrous nonwoven having around 20% polypropylene fibers and a higher proportion of reinforcing fibers (glass, aramide etc.). It is essential that that precompressed fibrous nonwovens are used for the reinforcing layers in order to be able to transport sufficient heat into the bonding region between the reinforcing layer and the core layer during the heating phase, without impairing the reinforcing layers and their physical properties and in particular their air-permeability. This heating phase can be adjusted by the expert in such a manner that a temperature profile can be achieved which is suited to the dimensions and composition of the part to be formed. For this, the expert will adjust the temperature, the pressure force of the plates 12, 13 and the heat-up time. This temperature profile shows relatively high temperatures close to the plates and remains relatively cool within the core zone. Typically it is desirable to reach temperatures of between 160° C. to 220° C. This has the result that the honeycomb structure of the core layer 2 is softened only in its bonding zone, i.e. its shape is not impaired or destroyed, whilst permitting it to bond with the adjacent reinforcing layers 3, 4. After this heating phase the stack 11 is transferred into a cold moulding tool 14, in which the heated stack 11 is brought into its final shape and the various layers 2, 3, 4, 5, 6 are bonded to each other.

It is to be understood that the heated stack 11 can be provided with additional decor layers 5, 6 during the transfer, and that the part to be formed can be cut to size during or after the forming process. As a rule, these decor layers 5, 6 are heat sensitive and are therefore usually applied only after the stack has been heated. In a further development of this process an air impermeable foil is inserted between the heated stack 11 and one of the decor layers 5, 6, said foil acting as an adhesive aid.

What is claimed is:

1. A component part, in particular a rear parcel shelf, having a honeycomb core layer (2), which is provided on both sides with a reinforcing layer (3, 4) made of fibrous material, wherein the reinforcing layer (3, 4) comprises a nonwoven having thermoplastic fibers, the core layer (2) is made of a thermoplastic material and is materially bonded with the thermoplastic fibers of the reinforcing layer (3, 4), the reinforcing layer (3, 4) is precompressed, is air permeable and has an air flow resistance in the range of 500 $Nsm^{-3} < R < 3500$ $Nsm^{-3}$.

2. Component part according to claim 1, wherein the reinforcing layer (3, 4) comprises a fibrous nonwoven having a content of at least 50% polypropylene fibers.

3. Component part according to claim 1, wherein the reinforcing layer (3, 4) comprises a fibrous nonwoven having a content of about 20% polypropylene fibers and a fibrous nonwoven comprising polypropylene SMMS-material.

4. Component part according to claim 1, wherein the reinforcing layer (3) on a passenger compartment side comprises between 50% to 80% polypropylene fibers and between 20% to 50% glass fibers or polyester fibers or aramide fibers.

5. Component part according to claim 1, wherein the reinforcing layers (3, 4) have an area weight of between 300 to 1000 $g/m^2$.

6. Component part according to claim 1, wherein the honeycomb core layer (2) has a thickness of 10 mm to 30 mm and an area weight in the range of 800 $g/m^2$ to 1600 $g/m^2$, that means has a density of 25 $kg/M^3$ to 160 $kg/M^3$.

7. Component part according to claim 1, wherein the reinforcing layer (3) on the passenger compartment side is provided with an air permeable decor layer (5).

8. Component part according to claim 1, wherein the reinforcing layer (4) on the trunk/boot side is provided with an air permeable decor layer (6).

9. Component part according to claim 1, wherein said component part is provided with a thin, air impermeable foil on the passenger compartment side or on the trunk/boot side.

10. Method for producing a component part, in particular a rear parcel shelf, wherein a stack (11) having at least the following succession of layers is provided:

a first precompressed, air permeable reinforcing layer (4) made of a fibrous nonwoven having thermoplastic fibers;

a honeycomb core layer (2) made of a thermoplastic material;

a second precompressed, air permeable reinforcing layer (3) made of a fibrous nonwoven having thermoplastic fibers;

in a next method step, said stack being heated between heatable plates (12, 13), in order to soften the reinforcing layers (3, 4) and the honeycomb core layer (2) in their bonding regions; and in a next method step said stack (11) being transferred into a cold moulding tool (14) and being brought into its desired form.

11. Method according to claim 10, wherein the heated stack (11) is provided with decor layers (5, 6) prior to being inserted into the cold moulding tool (14).

12. Component part according to claim 4, wherein the reinforcing layer (3) on the passenger compartment side comprises about 70% polypropylene fibers.

13. Component part according to claim 4, wherein the reinforcing layer (3) on the passenger compartment side comprises about 30% glass fibers or polyester fibers or aramide fibers.

* * * * *